(12) United States Patent
Beasley et al.

(10) Patent No.: US 9,151,856 B2
(45) Date of Patent: Oct. 6, 2015

(54) SEPARATING INTERFERING SIGNALS IN SEISMIC DATA

(75) Inventors: Craig J. Beasley, Houston, TX (US); William H. Dragoset, Jr., Houston, TX (US); Antoun Salama, Katy, TX (US)

(73) Assignee: WesternGeco L.L.C., Houston, TX (US)

( * ) Notice: Subject to any disclaimer, the term of this patent is extended or adjusted under 35 U.S.C. 154(b) by 112 days.

(21) Appl. No.: 13/111,111

(22) Filed: May 19, 2011

(65) Prior Publication Data

US 2012/0155218 A1 Jun. 21, 2012

Related U.S. Application Data

(60) Provisional application No. 61/425,598, filed on Dec. 21, 2010.

(51) Int. Cl.
*G01V 1/00* (2006.01)
*G01V 1/36* (2006.01)

(52) U.S. Cl.
CPC ............... *G01V 1/364* (2013.01); *G01V 1/005* (2013.01); *G01V 2210/3246* (2013.01); *G01V 2210/40* (2013.01)

(58) Field of Classification Search
CPC .............. G01V 1/005; G01V 1/364; G01V 2210/3246; G01V 2210/40
USPC ................................. 367/46, 36; 702/14, 17
See application file for complete search history.

(56) References Cited

U.S. PATENT DOCUMENTS

| | | | |
|---|---|---|---|
| 4,608,673 A | 8/1986 | Lazear | |
| 8,174,928 B2 | 5/2012 | Beasley | |
| 2005/0027454 A1* | 2/2005 | Vaage et al. | 702/17 |
| 2006/0247860 A1 | 11/2006 | Angerer et al. | |
| 2007/0055465 A1 | 3/2007 | Lecerf et al. | |
| 2010/0097888 A1* | 4/2010 | Neelamani et al. | 367/53 |
| 2010/0271904 A1* | 10/2010 | Moore et al. | 367/73 |
| 2010/0299070 A1 | 11/2010 | Abma | |

OTHER PUBLICATIONS

Doulgeris, P., Mahdad, A., and Blacquiere, G., "Separation of Blended Impulsive Sources Using an Interative Approach", 72rd EAGE Conference & Exhibition incorporating SPE Europe 2010, Jun. 2010: pp. 1-5.
Beasley, C., Salama, A., and Dragoset, B., "A 3D Simultaneous Source Field Test Processed by Active Seperation", 73rd EAGE Conference & Exhibition incorporating SPE Europe 2011, May 2011: pp. 1-5.
International Search Report and Written Opinion of PCT Application No. PCT/US2011/065710 dated Sep. 3, 2012: pp. 1-9.
Office Action issued in Mexican Application No. Mx/a/2013/007112 on Oct. 3, 2014, 3 pages.

* cited by examiner

*Primary Examiner* — Luke Ratcliffe
*Assistant Examiner* — Hovhannes Baghdasaryan
(74) *Attorney, Agent, or Firm* — Abimbola Bukoye (57) ABSTRACT

A method for processing seismic data. The method may include receiving seismic data due to a plurality of seismic sources and applying a first operator to the seismic data to generate a first estimate of seismic data. The method may then include applying a second operator to the first estimate of seismic data to generate residual seismic data due to one or more seismic sources. The method may determine a second estimate of seismic data based on the first estimate and the residual seismic data. The method may then process the second estimate of seismic data due to each seismic source to determine the presence of hydrocarbon deposits in a subterranean area of the earth.

6 Claims, 5 Drawing Sheets

SEPARATING INTERFERING SIGNALS IN SEISMIC DATA

RELATED APPLICATIONS

This application claims priority to provisional U.S. Patent Application Ser. No. 61/425,598, titled ITERATIVE METHOD FOR SEPARATING INTERFERING SIGNALS, filed Dec. 21, 2010, which is herein incorporated by reference.

BACKGROUND OF THE INVENTION

1. Field of the Invention

Implementations of various technologies described herein generally relate to seismic data processing. In particular, various technologies described herein relate to a method for separating interfering signals in seismic data.

2. Description of the Related Art

For many years, seismic exploration for oil and gas has been conducted by use of a source of seismic energy and the reception of the energy generated by the source by an array of seismic detectors. The source of seismic energy may be a high explosive charge or another energy source having the capacity to deliver a series of impacts, vibrations or seismic waves to the earth's surface. Seismic waves generated by these sources travel downwardly into geological formations in the earth's subsurface and are reflected back from strata boundaries and reach the surface of the earth at varying intervals of time, depending on the distance traveled and the characteristics of the subsurface traversed. These returning waves are detected by the sensors, which function to transform such seismic waves into electrical signals that represent features of geological formations. The detected signals are recorded for processing using digital computers. The processing then generates seismic data which can be analyzed to determine the presence or absence of probable locations of hydrocarbon deposits.

SUMMARY OF THE INVENTION

Described herein are implementations of various techniques of a method for separating interfering signals in seismic data. In one implementation, the method may include receiving seismic data due to a plurality of seismic sources and applying a first operator to the seismic data in an $i^{th}$ domain to generate a first estimate of seismic data due to an $i^{th}$ seismic source. The $i^{th}$ domain may correspond to the $i^{th}$ seismic source of the plurality of seismic sources. The method may then include applying a second operator to the first estimate of seismic data due to the $i^{th}$ seismic source in one or more domains other than the $i^{th}$ domain to generate residual seismic data due to one or more seismic sources other than the $i^{th}$ seismic source. After applying the a second operator to the first estimate of seismic data due to the $i^{th}$ seismic source, the method may determine a second estimate of seismic data due to the $i^{th}$ seismic source based on the first estimate and the residual seismic data due to the seismic sources other than the $i^{th}$ seismic source. The method may then repeat some of the steps described above (i.e., applying a first operator to the seismic data, applying a second operator to the first estimate of seismic data and determining a second estimate of seismic data due to the $i^{th}$ seismic source for each seismic source). The method may then process the second estimate of seismic data due to each seismic source to determine the presence of hydrocarbon deposits in a subterranean area of the earth.

In another implementation, the method for separating interfering signals in seismic data may include receiving seismic data and applying a first operator to the seismic data in a first domain to generate a first set of seismic data that corresponds to seismic data due to a first seismic source. After applying the first operator, the method may include applying a second operator to the first set of seismic data in a second domain to generate a second set of seismic data that corresponds to residual seismic data due to a second seismic source. The method may then include applying the first operator to the seismic data in a second domain to generate a third set of seismic data that corresponds to seismic data due to the second seismic source. The method may then apply the second operator to the third set of seismic data in the first domain to generate a fourth set of seismic data that corresponds to residual seismic data due to the first seismic source. After applying the second operator, the method may determine an estimate of seismic data due to the first source based on the first, second and fourth sets of seismic data. The method may then include determining an estimate of seismic data due to the second source based on the second, third and fourth sets of seismic data. After the method determining the estimate of seismic data due to the second source, the method may include processing the estimates of seismic data due to the first source and the second source to determine the presence of hydrocarbon deposits in a subterranean area of the earth.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief summary of various technologies and techniques directed at separating interfering signals due to two seismic sources from seismic data in accordance with one or more implementations described herein.

In one implementation, a computer application may receive seismic data (D) that have been acquired due to a plurality of sources. The computer application may first apply a first operator (i.e., $P_1$) to the seismic data to approximately separate the sources in the seismic data. For instance, the computer application may apply the first operator (i.e., $P_1$) to the seismic data (D) in a first data domain to generate a first set of seismic data (i.e., $P_1D$), which includes seismic data that corresponds to the seismic data that has been acquired due to a first source.

The first set of seismic data ($P_1D$) may include the energy primarily due to the first source ($D_1^*$) plus the energy due to the second source ($R_2$) that has leaked into the first set of seismic data ($P_1D$) minus the energy due to the first source ($R_1$) that has leaked out of the first set of seismic data ($P_1D$). The relationship between the first set of seismic data (i.e., $P_1D$), the seismic data primarily due to the first source (i.e., $D_1^*$), the residual/leakage seismic data due to the first source (i.e., $R_1$) and the residual/leakage seismic data due to the second source (i.e., $R_2$) is described below in equation 1.

$$P_1D = D_1^* + R_2 - R_1 \quad \text{Equation 1}$$

The computer application may use the residual seismic data due to the first source (i.e., $R_1$) and the residual seismic data due to the second source (i.e., $R_2$) to determine an approximation of the seismic data that corresponds to the first source (i.e., $D_1$).

After applying a first operator (i.e., $P_1$) to the seismic data, the computer application may apply a second operator ($S_2$) in a second domain to the first set of seismic data ($P_1D$) to generate a second set of seismic data ($S_2P_1D$), which may include seismic data that corresponds to residual seismic data due to the second source (i.e., $R_2$).

The computer application may then apply the first operator (i.e., $P_2$) to the seismic data (D) in the second data domain to generate a third set of seismic data (i.e., $P_2D$), which may include seismic data that corresponds to the seismic data that is primarily due to the second source (i.e., $D_2^*$).

Like the first set of seismic data ($P_1D$), the third set of seismic data ($P_2D$) may include the energy primarily due to the second source ($D_2^*$) plus the energy due to the first source ($R_1$) that has leaked into the first set of seismic data ($P_1D$) minus the energy due to the first second ($R_2$) that has leaked out of the third set of seismic data ($P_2D$). The relationship between the third set of seismic data (i.e., $P_2D$), the seismic data primarily due to the second source (i.e., $D_2^*$), the residual seismic data due to the second source (i.e., $R_2$) and the residual seismic data due to the first source (i.e., $R_1$) is described in equation 2 below.

$$P_2D = D_2^* + R_1 - R_2 \quad \text{Equation 2}$$

As mentioned above, the computer application may use the residual seismic data due to the second source (i.e., $R_2$) and the residual seismic data due to the first source (i.e., $R_1$) to determine an approximation of the seismic data that corresponds to the second source (i.e., $D_2$).

The computer application may then apply the second operator ($S_1$) in the first domain to the third set of seismic data ($P_2D$) to generate a fourth set of seismic data ($S_1P_2D$), which may include seismic data that corresponds to leakage data due to the first source (i.e., $R_1$).

Using the first, second, third and fourth sets of seismic data, the computer application may determine approximations of seismic data that correspond to the first source (i.e., $D_1$) and the second source (i.e., $D_2$) as shown below.

$$P_1D - R_2 + R_1 = (D_1^* + R_2 - R_1) - R_2 + R_1 = D_1$$

$$P_2D - R_1 + R_2 = (D_2^* + R_1 - R_2) - R_1 + R_2 = D_2$$

where ($D_1^* + R_2 - R_1$) is the first set of seismic data, $R_1$ is the second set of seismic data, ($D_2^* + R_1 - R_2$) is the third set of seismic data and $R_2$ is the fourth set of seismic data. As a result, the computer application may have separated the interfering signals due to the two seismic sources from the seismic data.

Various techniques for separating interfering signals from seismic data will now be described in more detail with reference to FIGS. 1-4 in the following paragraphs.

Figure 1:
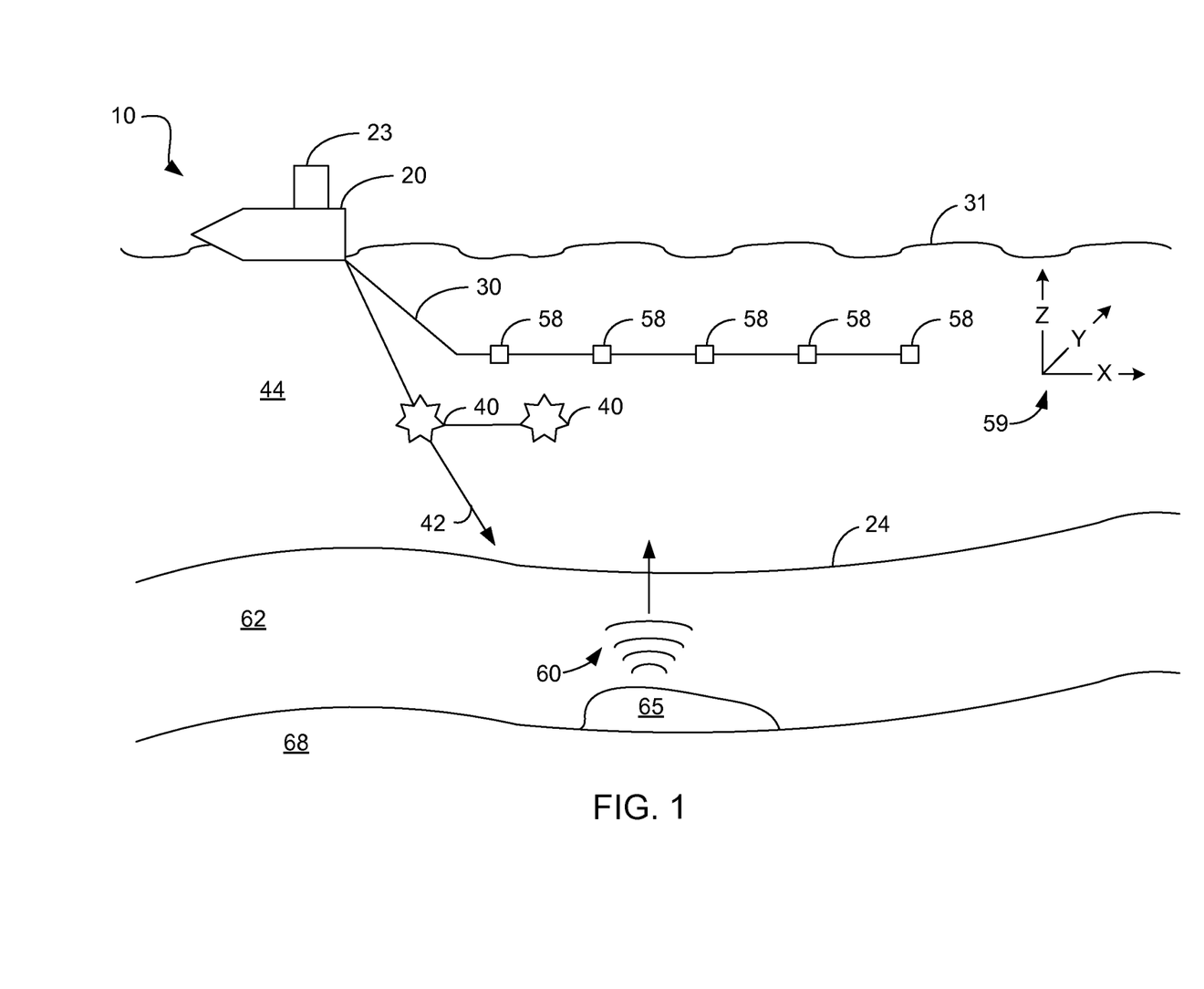
FIG. 1 illustrates a schematic diagram of a marine-based seismic acquisition system in accordance with implementations of various techniques described herein.

FIG. 1 illustrates a schematic diagram of a marine-based seismic acquisition system 10 in accordance with implementations of various techniques described herein. In system 10, survey vessel 20 tows one or more seismic streamers 30 (one streamer 30 being depicted in FIG. 1) behind the vessel 20. In one implementation, streamers 30 may be arranged in a spread in which multiple streamers 30 are towed in approximately the same plane at the same depth. In another implementation, the streamers may be towed at multiple depths, such as in an over/under configuration.

Seismic streamers 30 may be several thousand meters long and may contain various support cables, as well as wiring and/or circuitry that may be used to facilitate communication along the streamers 30. In general, each streamer 30 may include a primary cable where seismic sensors 58 that record seismic signals may be mounted. In one implementation, seismic sensors 58 may include hydrophones that acquire pressure data. In another implementation, seismic sensors 58 may include multi-component sensors such that each sensor is capable of detecting a pressure wavefield and at least one component of a particle motion that is associated with acoustic signals that are proximate to the sensor. Examples of particle motions include one or more components of a particle displacement, one or more components (i.e., inline (x), crossline (y) and vertical (z) components (see axes 59) of a particle velocity and one or more components of a particle acceleration.

Marine-based seismic data acquisition system 10 may also include one or more seismic sources 40, such as air guns and the like. In one implementation, seismic sources 40 may be coupled to, or towed by, the survey vessel 20. Alternatively, seismic sources 40 may operate independently of the survey vessel 20 in that the sources 40 may be coupled to other vessels or buoys.

As seismic streamers 30 are towed behind the survey vessel 20, acoustic signals 42, often referred to as "shots," may be produced by seismic sources 40 and are directed down through a water column 44 into strata 62 and 68 beneath a water bottom surface 24. Acoustic signals 42 may be reflected from the various subterranean geological formations, such as formation 65 depicted in FIG. 1.

The incident acoustic signals 42 that are generated by the sources 40 produce corresponding reflected acoustic signals, or pressure waves 60, which may be sensed by seismic sensors 58. In one implementation, pressure waves received and sensed by seismic sensors 58 may include "up going" pressure waves that propagate to the sensors 58 without reflection, as well as "down going" pressure waves that are produced by reflections of the pressure waves 60 from air-water boundary 31.

Seismic sensors 58 generate signals, called "traces," which indicate the acquired measurements of the pressure wavefield and particle motion. The traces (i.e., seismic data) may be recorded and may be processed by signal processing unit 23 deployed on the survey vessel 20.

The goal of the seismic acquisition is to build up an image of a survey area for purposes of identifying subterranean geological formations, such as the exemplary geological formation 65. Subsequent analysis of the image may reveal probable locations of hydrocarbon deposits in subterranean geological formations. In one implementation, portions of the analysis of the image may be performed on the seismic survey vessel 20, such as by the signal processing unit 23.

A particular seismic source 40 may be part of an array of seismic source elements (such as air guns, for example) that may be arranged in strings (gun strings, for example) of the array. Regardless of the particular composition of the seismic sources, the sources may be fired in a particular time sequence during the survey. Although FIG. 1 illustrates a marine-based seismic acquisition system, the marine-based seismic acquisition system is provided as an example of a seismic acquisition system that may correspond to the methods described herein. However, it should be noted that the methods described herein may also be performed on a land-based seismic acquisition system.

Figure 2:
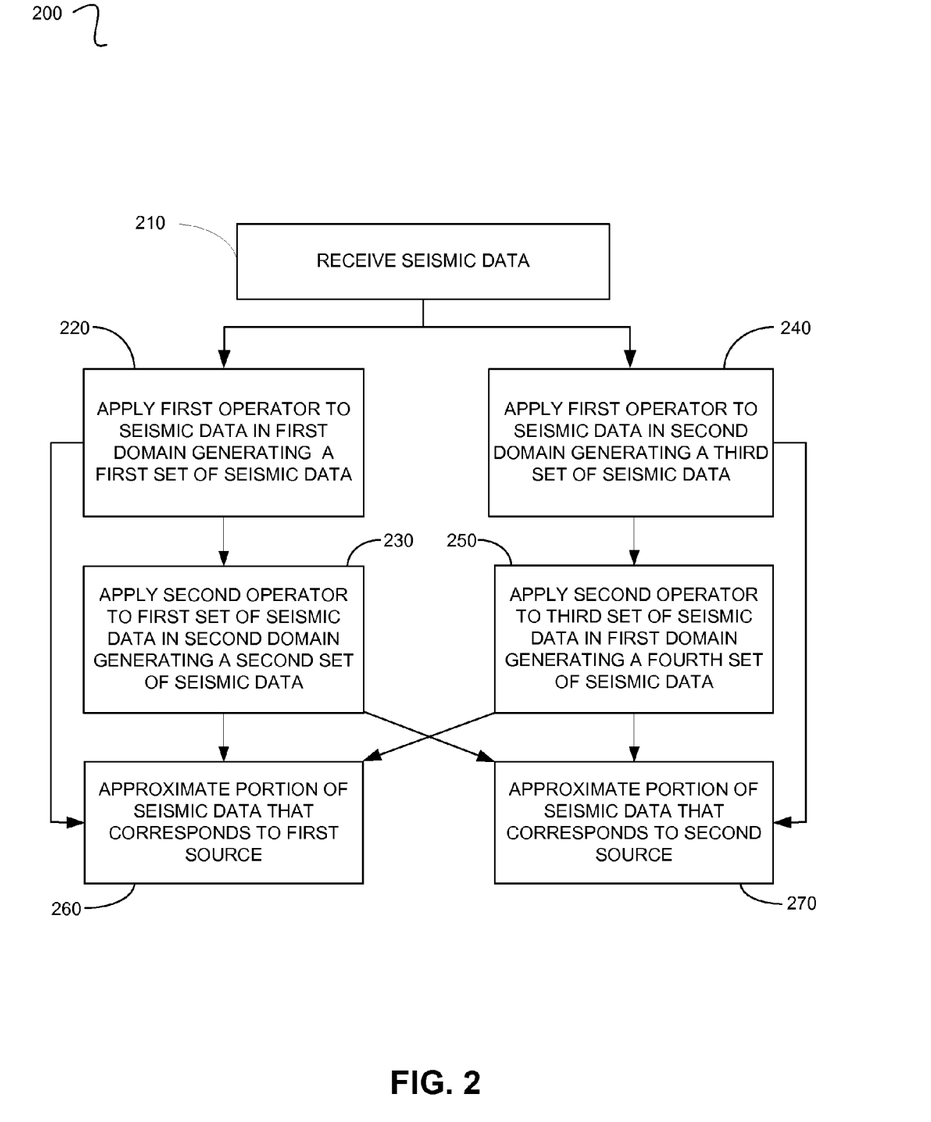
FIG. 2 illustrates a flow diagram of a method for separating interfering signals from seismic data in a two-source seismic system in accordance with implementations of various techniques described herein.

FIG. 2 illustrates a flow diagram of a method 200 for separating interfering signals from seismic data in a two-source seismic system in accordance with implementations of various techniques described herein. In one implementation, method 200 may be performed by a computer application. It should be understood that while method 200 indicates a particular order of execution of operations, in some implementations, certain portions of the operations might be executed in a different order.

Method 200 may be implemented on seismic data acquired using simultaneous sources, near-simultaneous sources, sources with encoding having random or pseudorandom time shifts, random or pseudorandom firing sequences, sources with time coding, sources with phase coding and the like. Although method 200 is described below using a two-source seismic system, in some implementations method 200 may be performed with more than two sources.

In one implementation, seismic sources 40 may be fired simultaneously or near simultaneously in a short interval of time so that a composite energy signal (i.e., seismic data) may be sensed by seismic sensors 58. Here, the seismic data may contain a significant amount of energy from more than one seismic source 40. As such, the seismic sources may interfere with each other such that the seismic data may not be easily separable into signals that may be attributed to the specific sources.

The use of simultaneously-fired or near-simultaneously-fired seismic sources in which signals from the sources interfere for at least part of each record has benefits in terms of acquisition efficiency and inline source sampling. Method 200 may be used to separate the acquired seismic data into datasets that are each associated with one of the seismic sources such that the benefits of acquisition efficiency and inline source sampling may be attained.

At step 210, the computer application may receive seismic data (D). Seismic data may have been acquired using a plurality of sources as shown in FIG. 1. As mentioned above, although FIG. 1 illustrates a marine-based seismic acquisition system, in some implementations method 200 may be performed using seismic data acquired from a land-based seismic acquisition system.

At step 220, the computer application may apply a first operator (P) to the seismic data (D) in a first data domain ($P_1$, subscript number refers to source domain) to generate a first set of seismic data ($P_1D$). The first operator (P) may be any function configured to approximately separate the sources in the seismic data. The first operator (P) may be a projection operator or a filter operator, such as a low frequency filter of sources, a coherency filter, an f-k filter, a tau-p filter, a wavelet filter, a curvelet filter, a median filter, a threshold filter, a mask filter, a Random Noise Attenuation (RNA) filter, a Singular Value Decomposition (SVD) filter, a model driven filter, a datuming filter, a wavefield extrapolation filter, a migration filter, an inverse filter, and the like. In one implementation, the first operator (P) may include a combination of two or more filters and may be multi-dimensional.

In another implementation, the first operator (P) may include performing a domain change (e.g., encoding or decoding) to seismic data. For example, if shots from seismic sources are encoded with time shifts and seismic data $D_i$ is naturally referenced to the timing for source i, a projection could first be applied to transform the seismic data to a different time frame, e.g., for the $j^{th}$ source, prior to applying a filter operator.

The first data domain ($P_1$) may be a domain that corresponds to a particular source. For instance, if, at step 220, the first operator (P) is configured to identify a portion of the seismic data (D) that corresponds to the first source, the first data domain ($P_1$) may be a time domain measured with respect to the first source.

Applying the first operator ($P_1$) to seismic data described in step 220 may include applying a low frequency filter to seismic data in a domain that corresponds to a first seismic source. After applying the low frequency filter to the seismic data, the resulting seismic data may be a low frequency model of the seismic data that primarily includes seismic data due to the first source. The low frequency model of the seismic data may then be used to drive another filter in a different domain. As such, the low frequency model of the seismic data may be transformed into the different domain and the resulting low frequency model of the seismic data in the different domain may be used as a threshold filter to identify the seismic data that corresponds to the first source. In this example, the application of the low frequency filter to the seismic data, the transformation of the low frequency model, and the use of the transformed low frequency model as a threshold filter may all encompass applying the first operator ($P_1$) to the seismic data.

After applying the first operator ($P_1$) to the seismic data in the first data domain, the computer application may generate a first set of seismic data ($P_1D$) that primarily includes seismic data due to the first source (i.e., first estimate of seismic data due to the first source). However, some of the seismic data due to the first source may have leaked off (i.e., residual/leakage seismic data) from the first set of seismic data ($P_1D$). Similarly, the first set of seismic data may also include interfering signals due to the second source that may have leaked into (i.e., residual or leakage data) the first set of seismic data ($P_1D$).

For a two-source seismic system, the relationship between the first set of seismic data (i.e., $P_1D$), the seismic data primarily due to the first source (i.e., $D_1^*$), the residual seismic data due to the first source (i.e., $R_1$) and the residual seismic data due to the second source (i.e., $R_2$) is described below:

$$P_1D = D_1^* + R_2 - R_1 \qquad \text{Equation 1}$$

where $D_1^*$ is the seismic data primarily due to the first source, $R_2$ is the leaked energy for the second source and $R_1$ is the leaked energy for the first source. As such, the result $(P_1D)$ of applying the first operator $(P_1)$ to the seismic data (D) in the first domain includes the energy primarily due to the first source $(D_1^*)$ plus the energy due to the second $(R_2)$ that has leaked into the result $(P_1D)$ minus the energy due to the first source $(R_1)$ that has leaked out of the result $(P_1D)$. In order to effectively separate the signals due to the first source and the second source from the seismic data, the computer application should add the energy due to the first source $(R_1)$ that has leaked out of the result back into the result $(P_1D)$ and subtract the energy due to the second source $(R_2)$ that has leaked into the result from the result $(P_1D)$.

At step 230, the computer application may apply a second operator (S) to the first set of seismic data $(P_1D)$ in a second data domain $(S_2)$ to generate a second set of seismic data. $(S_2P_1D)$. Like the first operator $(P_1)$, the second operator (S) may be any function that is configured to approximately separate the sources in the seismic data. In one implementation, the second operator (S) may seek to exploit particular aspects of the seismic data and the leakage data. For instance, the second operator (S) may be chosen to approximately pass the energy due to the second source $(R_2)$ and annihilate the energy primarily due to the first source $(D_1^*)$ minus the energy due to the first source $(R_1)$ from the first set of seismic data $(P_1D)$. In this manner, the second operator (S) may be configured to identify just the energy due to the second source $(R_2)$ in the first set of seismic data as show below:

$$S_2P_1D \approx R_2 \qquad \text{Equation 3}$$

In one implementation, the second operator $(S_2)$ may be the same as the first operator $(P_1)$.

Additionally, like the first data domain, the second data domain may be a domain that corresponds to a particular source. In one implementation, in order to identify the residual or leakage data due to the second source (i.e., $R_2$), the second data domain may be a time domain measured with respect to the second source. By applying the second operator (S) to the first set of seismic data in the second domain, the computer application may generate a second set of seismic data which includes seismic data that corresponds to residual/leakage data due to the second source (i.e., $R_2$).

After identifying the second set of seismic data which includes seismic data that corresponds to residual/leakage data due to the second source (i.e., $R_2$), the computer application may determine the residual/leakage data due to the first source (i.e., $R_1$) that has leaked out of the result $(P_1D)$ such that the residual/leakage data due to the first source $(R_1)$ may be added back into the result $(P_1D)$. Steps 240-250 describe this process.

At step 240, the computer application may apply the first operator (P) to the seismic data (D) in a second data domain $(P_2)$ to generate a third set of seismic data $(P_2D)$. As such, step 240 may be similar to step 220 except that the first operator $(P_2)$ may now be applied to the seismic data in the second data domain, as opposed to the first data domain. In this manner, by applying the first operator $(P_2)$ to the seismic data in the second data domain, the computer application generates the third set of seismic data $(P_2D)$ that primarily includes seismic data due to the second source (i.e., first estimate of seismic data due to the second source). Like the first set of seismic data, the third set of seismic data $(P_2D)$ may have lost some of the seismic data due to the second source that may have leaked off (i.e., residual/leakage seismic data) from applying the first operator $(P_2)$ to the seismic data. Similarly, the third set of seismic data $(P_2D)$ may also include interfering signals (i.e., residual or leakage data) due to the first source that may have leaked into the third set of seismic data $(P_2D)$.

For the two-source seismic system, the relationship between the third set of seismic data (i.e., $P_2D$), the seismic data primarily due to the second source (i.e., $D_2^*$), the residual seismic data due to the second source (i.e., $R_2$) and the residual seismic data due to the first source (i.e., $R_2$) is described below:

$$P_2D = D_2^* + R_1 - R_2 \qquad \text{Equation 4}$$

As such, the result $(P_2D)$ of applying the first operator $(P_2)$ to the seismic data (D) in the second domain is the energy primarily due to the second source $(D_2^*)$ plus the energy due to the first $(R_1)$ that has leaked into the result $(P_2D)$ minus the energy due to the second source $(R_2)$ that has leaked from of the result $(P_2D)$.

At step 250, the computer application may apply the second operator (S) to the third set of seismic data $(P_2D)$ in the first data domain $(S_1)$ to generate a fourth set of seismic data $(S_1P_2D)$. Like the second operator $(S_2)$ applied in step 230, the second operator $(S_1)$ applied at step 250 may be chosen to approximately pass the energy due to the first source $(R_1)$ and annihilate the energy primarily due to the second source $(D_2^*)$ minus the energy due to the second source $(R_2)$ from the third set of seismic data $(P_2D)$. In this manner, the second operator $(S_1)$ may be configured to identify just the energy due to the first source $(R_1)$ as shown below:

$$S_1P_2D \approx R_1 \qquad \text{Equation 5}$$

By applying the second operator $(S_1)$ to the seismic data in the first data domain, the computer application identifies the fourth set of seismic data that includes seismic data that corresponds to residual/leakage data due to the first source (i.e., $R_1$).

At step 260, the computer application may generate an approximation of the seismic data that corresponds to the first source (i.e., second estimate of seismic data due to the first source) based on the first, second and fourth sets of seismic data. That is, the computer application may generate an approximation of the seismic data that corresponds to the first source based on the seismic data that primarily includes seismic data due to the first source, the residual seismic data from other sources that leaked into the seismic data and the residual seismic data due to the first source that leak out of the seismic data. Additional details describing how the first, second and fourth sets of seismic data are used to generate the approximate seismic data due to the first source is described with reference to FIG. 3A below.

Similarly, at step 270, the computer application may generate an approximation of the seismic data that corresponds to the second source (i.e., second estimate of seismic data due to the second source) based on the second, third and fourth sets of seismic data. That is, the computer application may generate an approximation of the seismic data that corresponds to the second source based on the seismic data that primarily includes seismic data due to the second source, the residual seismic data from other sources that leaked into the seismic data and the residual seismic data due to the second source that leak out of the seismic data. Additional details describing how the second, third and fourth sets of seismic data are used to generate the approximate seismic data due to the second source is described with reference to FIG. 3B below.

Figure 3A:
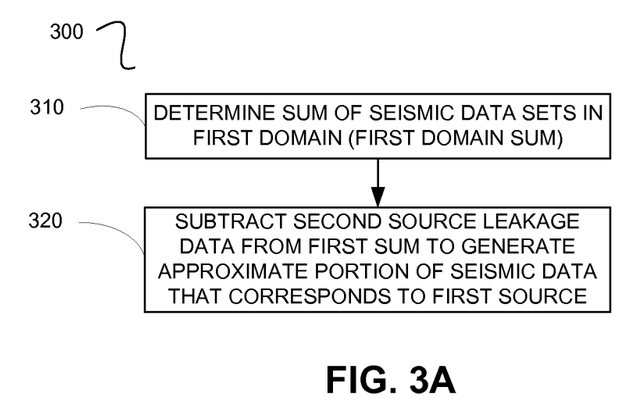
FIGS. 3A-3B illustrate flow diagrams of methods for generating approximate portions of seismic data that correspond to each seismic source in a two-source seismic system in accordance with implementations of various techniques described herein.
Figure 3B:
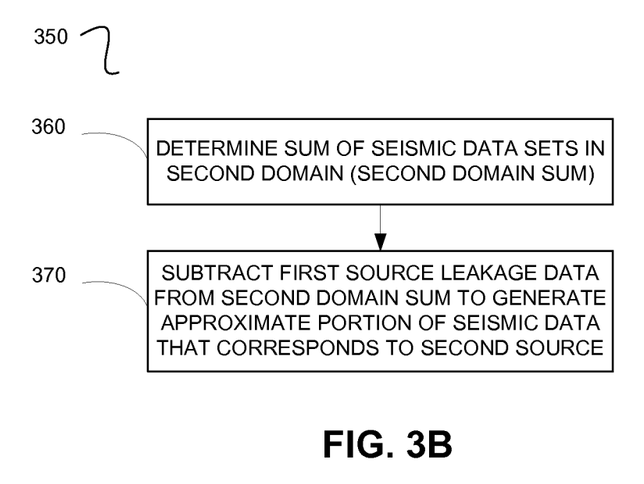

FIGS. 3A-3B illustrate flow diagrams of method 300 and method 350 for generating an approximate portion of seismic data that corresponds to the first and second seismic source in a two-source seismic system in accordance with implementations of various techniques described herein. In one implementation, method 300 and method 350 may be performed by a computer application. It should be understood that while method 300 and method 350 indicates a particular order of execution of operations, in some implementations, certain portions of the operations might be executed in a different order. The following description of method 300 and method 350 are made with reference to method 200 of FIG. 2.

At step 310, the computer application may determine a sum (i.e., first domain sum) of seismic data sets that were obtained after applying an operator to data in the first domain (i.e., first and fourth sets of seismic data). In this manner, the computer application may add all of the seismic datasets that include seismic data due to the first source (i.e., seismic data primarily due to the first source ($P_1D$) and residual/leakage seismic data due to the first source ($R_1$)). The summation of step 310 may be represented as follows:

$$P_1D + S_1P_2D = P_1D + R_1 = (D_1{}^* + R_2 - R_1) + R_1 = D_1{}^*R_2 \quad \text{Equation 6}$$

At step 320, the computer application may subtract the set of seismic data that corresponds to the residual seismic data due to the second source (i.e., second set of seismic data or $R_2$) from the first domain sum. In this manner, the residual seismic data due to the second source ($R_2$) that may be present in the first set of seismic data ($P_1D$) may be removed from the first domain sum ($D_1{}^* + R_2$) to generate an approximate portion of the original seismic data (D) that corresponds to just the first seismic source ($D_1$). The subtraction performed in step 320 may be represented as follows:

$$D_1{}^* + R_2 - R_2 = D_1 \quad \text{Equation 7}$$

Steps 360 and 370 of method 350 describe a process for generating an approximate portion of the original seismic data (D) that corresponds to the second seismic source ($D_2$). Steps 360 and 370 are similar to steps 310 and 320 described above but tailored for the second seismic source. As such, at step 360, the computer application may determine a sum (i.e., second domain sum) of seismic data sets that were obtained after applying an operator to data in the second domain (i.e., second and third sets of seismic data). In this manner, the computer application may add all of the seismic datasets that include seismic data due to the second source (i.e., seismic data primarily due to the second source ($P_2D$) and residual/leakage seismic data due to the second source ($R_2$)). The summation of step 360 may be represented as follows:

$$P_2D + S_2P_1D = P_2D + R_2 = (D_2{}^* + R_1 - R_2) + R_2 = D_2{}^*R_1 \quad \text{Equation 8}$$

At step 370, the computer application may subtract the set of seismic data that corresponds to the leakage seismic data due to the first source (i.e., fourth set of seismic data) from the second domain sum. In this manner, the residual seismic data due to the first source ($R_1$) that may be present in the third set of seismic data ($P_2D$) may be removed from the second domain sum ($D_2{}^* + R_1$) to generate an approximate portion of the original seismic data (D) that corresponds to just the second seismic source ($D_2$). The subtraction performed in step 370 may be represented as follows:

$$D_2{}^* + R_1 - R_1 = D_2 \quad \text{Equation 9}$$

In one implementation, after determining approximate portions of seismic data that corresponds to the first and second seismic source (i.e., $D_1$ and $D_2$), the computer application may repeat method 200, method 300 and method 350 iteratively using the approximate portions of seismic data that corresponds to the first and second seismic source (i.e., $D_1$ and $D_2$) as inputs into steps 230 and 250, respectively. By iteratively performing method 200, method 300 and method 350, the computer application may determine more accurate approximate portions of seismic data that corresponds to the first and second seismic source.

Although methods 200, 300 and 350 have been described for a two-source seismic system, it should be understood that these methods may be performed for a seismic system that includes more than two sources. Referring back to steps 220 and 240, after applying the first operator (P) to the seismic data in a particular domain, the resulting seismic data included energy primarily due to the particular source ($D_1{}^*/D_2{}^*$) plus the energy due to other sources ($R_2/R_1$) that leaked into the result ($P_1D/P_2D$) minus the energy due to the particular source ($R_1/R_2$) that has leaked out of the result ($P_1D/P_2D$). Similarly, for seismic source systems that include more than two sources, a first operator (P) may be applied to the seismic data multiple times in multiple domains to acquire seismic data that include energy primarily due to each particular source. As a result, the computer application may obtain sets of seismic data that include seismic data that primarily includes data due to the particular source plus various energies due to sources other than the particular source that leaked into the result minus energy due to the particular source that leaked out of the result.

The computer application may then use the acquired sets of seismic data to determine the various energies due to sources other than the particular source that leaked into the result and the energy due to the particular source that leaked out of the result using a process similar to step 230 described above. After identifying these energies, the computer application may determine the approximate portion of the seismic data that corresponds to the particular source by determining the sum of the seismic data due to a particular source (i.e., seismic data primarily due to particular source and residual seismic data due to particular source), and subtracting the various energies due to other sources other than the particular source that leaked into the seismic data from the sum, as described in FIGS. 3A-3B.

Adopting a more compact notation, the general iterative scheme for any number (m) of sources can be written as $$D \cong D_1{}^n + D_2{}^n + D_3{}^n \ldots D_m{}^n$$

$$D_i{}^1 = P_i{}^0 D, i = 1, 2, \ldots, m$$

$$D_i{}^{n+1} = D_i{}^n + \Sigma_{k \neq i} P_i{}^n D_k{}^n - \Sigma_{k \neq i} P_k{}^n D_i{}^n, i = 1, 2, \ldots, m \quad \text{Equation 10}$$

where $i = 1, 2, \ldots, m$, m is the total number of sources, $D_i{}^n$ is the estimate of seismic data due to the $i^{th}$ source after the $n^{th}$ iteration, k is a summation index that runs over the number of sources and $P_i{}^n$ is the operator applied onto $D_i$. Intuitively, equation 10 can be understood as adding to the current estimate of $D_i$, the estimates of the leakage of $D_i$, into the other data estimates ($D_k$), and subtracting the estimates of leakage from the other sources into $D_i$. In other words, $D_i{}^n$ includes the resulting seismic data that includes energy primarily due to a particular source (e.g., $D_1{}^*$) after the operator is applied to seismic data. $\Sigma_{k \neq i} P_i{}^n D_k{}^n$ includes the energy due to the particular source (e.g., $R_1$) that has leaked out of the resulting seismic data, and $\Sigma_{k \neq i} P_k{}^n D_i{}^n$ includes the various energies due to sources other than the particular source that leaked into the resulting seismic data (e.g., $R_2$).

It should be noted that equation 10 can be iterated either synchronously such that all of the correction terms may first be computed and then all of the estimates of $D_i{}^{n+1}$ may be updated, or, it can be done progressively where the correction terms may be based on the current estimates of the data.

EXAMPLE

In one specific example of methods 200, 300 and 350, at step 210, the computer application may receive the seismic data as described above. Prior to step 220, the computer application may apply a severe RNA filter to the seismic data in the first domain to determine a model of the seismic data due to the first source. The computer application may then apply a severe RNA filter to the seismic data in the second domain to determine a model of seismic data due to the second source. The severe RNA filter may include an aggressive coherency filter configured to identify a portion of the seismic data that corresponds to a particular source with near certainty. Additionally, the computer application may transform the seismic data to the first domain and transform the seismic data to the second domain. In this example, the severe RNA filtering steps and data transformation steps are data preparation steps for methods 200, 300 and 350.

At step 220, the computer application may apply a general RNA filter (i.e., not severe) to the transformed seismic data in the second domain. As a result of applying the general RNA filter to the transformed seismic data in the second domain, the computer application may obtain the first set of seismic data that primarily includes seismic data due to the first source in the second domain. The computer application may then transform the first set of seismic data to the first domain (preparation for step 230).

At step 230, the computer application may compare or correlate the first set of seismic data in the first domain with the model of the seismic data due to the second source. As a result, the computer application may determine the leakage or residual seismic data due to the second source (i.e., second set of seismic data).

At step 240, the computer application may apply a general RNA filter (i.e., not severe) to the transformed seismic data in the first domain. As a result of applying the general RNA filter to the transformed seismic data in the first domain, the computer application may obtain the third set of seismic data ($P_2D$) that primarily includes seismic data due to the second source in the first domain. The computer application may then transform the third set of seismic data ($P_2D$) to the second domain (preparation for step 230).

At step 250, the computer application may compare or correlate the third set of seismic data ($P_2D$) in the second domain with the model of the seismic data due to the first source. As a result, the computer application may determine the leakage or residual seismic data due to the first source (i.e., fourth set of seismic data).

In this example, the RNA filters applied at steps 220 and 240 may have inherently removed the energies due to sources that have leaked into the result. These energies would normally be subtracted at steps 320 and 370. However, since these energies have already been removed, the computer application may just perform the summation steps recited at steps 310 and 360. As such, at step 310, the computer application may determine a sum of the seismic datasets that correspond to seismic data due to the first seismic source (i.e., first and fourth seismic data sets). The sum calculated at step 310 may be the approximate portion of seismic data that corresponds to the first seismic source.

Similarly, at step 360, the computer application may determine a sum of the seismic datasets that correspond to seismic data due to the second seismic source (i.e., second and third seismic data sets). The sum calculated at step 360 may be the approximate portion of seismic data that corresponds to the second seismic source.

Although the above example describes using an RNA filter for the first operator (P) and a model comparison as the second operator (S), it should be understood that the example above describes one implementation of the methods described herein and are not to be construed to limit the scope of the operators.

ADVANTAGES

The advantages of the methods described herein lie in the ability to choose operators (e.g., projections) to exploit data characteristics at various stages in the seismic data processing. For example, first operators ($P_i$) may be chosen to optimize the filter response to aliasing, the models under determination or amplitude imbalance, and the encoding schemes. Another class of filters may be described as exploiting different data organizations, such as sorting to different spatial arrangements (common offset, common receiver, common shot, etc.) and different encoding domains (phase encoding, time shifting, etc.).

The methods described herein may be applied to all types of seismic data—land, marine, borehole, nodes, permanent systems, etc. Further, the methods described herein may apply to interfering data that are either acquired in the field with interference or data that are combined after acquisition to produce interference. The interference may be intentional and may include any type of data encoding, such as phase encoding, time shifting, spatial position, random, pseudo random and optimal encoding schemes.

Although method 200 is described in the context of separating seismic data according to its contributing source, method 200 may also be applied to a wide variety of filtering problems. For instance, method 200 may also be applied as a general filter to eliminate noise.

Figure 4:
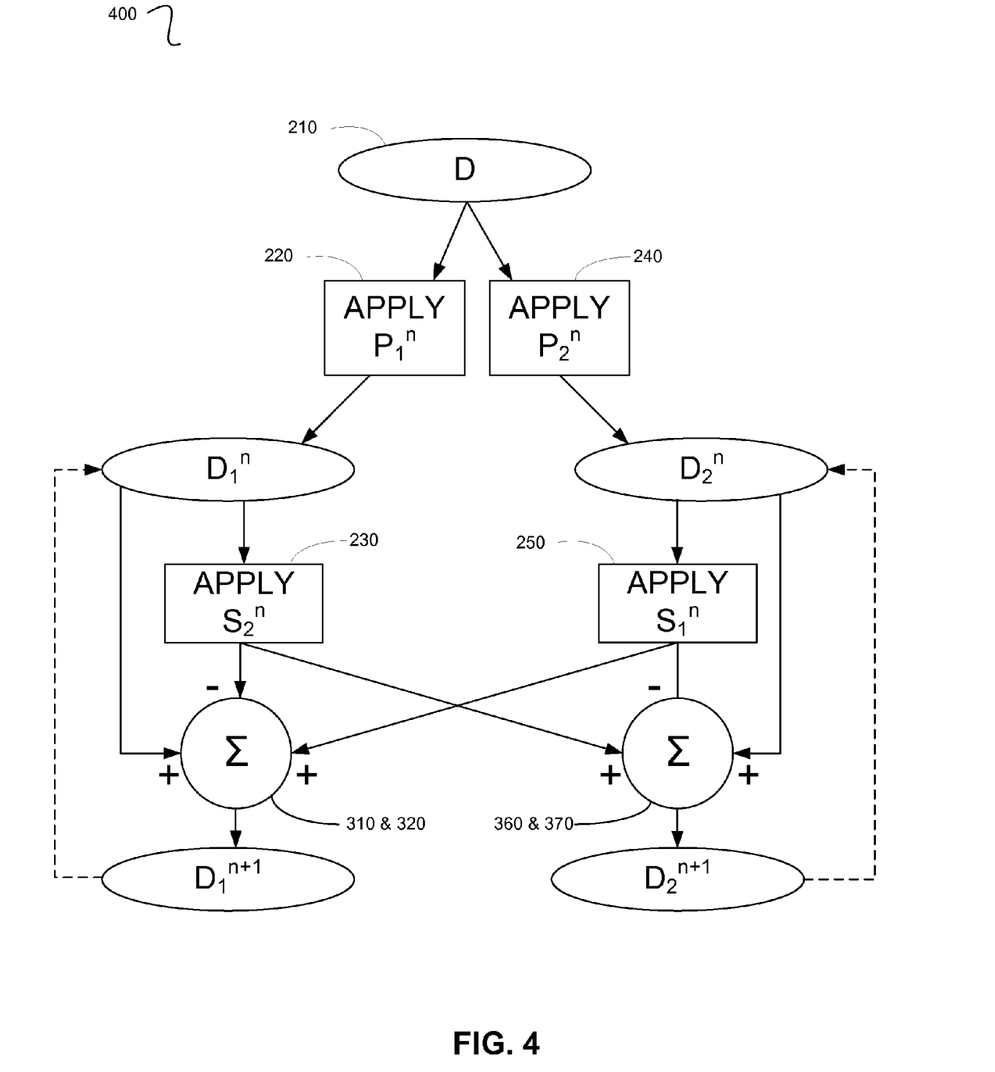
FIG. 4 illustrates a data flow diagram of a method for separating interfering signals from seismic data in a two-source seismic system in accordance with implementations of various techniques described herein.

FIG. 4 illustrates a data flow diagram 400 of a method for separating interfering signals from seismic data in a two-source seismic system in accordance with implementations of various techniques described herein. Data flow diagram 400 illustrates the processes described above in FIGS. 2-3B. As shown in FIG. 4, at step 210, the computer application receives seismic data D. At steps 220 and 240, the computer application may apply the first operator ($P_1''$ and $P_2''$) to the seismic data. The subscript in each of the terms $P_1''$ and $P_2''$ represent the domain in which the first operator (P) is applied to the seismic data. The superscript in each of the terms $P_1''$ and $P_2''$ represent which iteration of methods 200, 300 and 350 is being performed.

At steps 230 and 250, the computer application may apply the second operator ($S_2''$ and $S_1''$) to the product of steps 220 and 240 (i.e., $D_1''$ and $D_2''$). Steps 310-320 and 360-370 are represented in FIG. 4 as a summation function that adds the seismic data due to a particular source and subtracts the residual seismic data due a different source. As shown in FIG. 4, the second operator ($S_2/S_1$) may then be applied to the products/results of steps 310-320 and 360-370 at steps 230 and 250, in order to obtain a more accurate approximation of the seismic data due to a particular source.

Although FIG. 4 illustrates how the methods described herein are performed in a two-source seismic system, it should be understood that the methods described herein and the data flow diagram illustrated in FIG. 4 may be modified to account for more than two sources.

Figure 5:
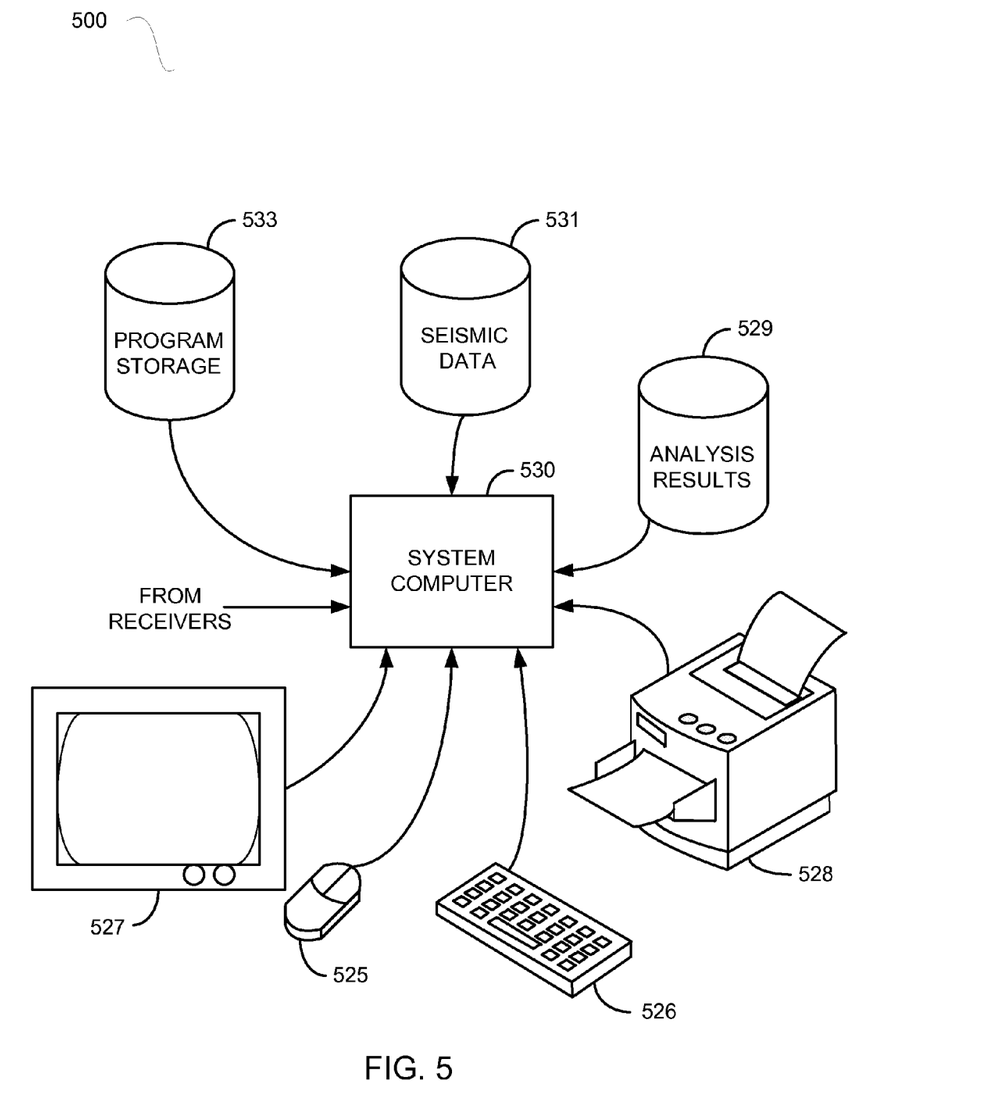
FIG. 5 illustrates a computer network into which implementations of various technologies described herein may be implemented.

FIG. 5 illustrates a computer network 500, into which implementations of various technologies described herein may be implemented. In one implementation, various techniques for separating interfering signals from seismic data as described in FIGS. 2, 3A, 3B and 4 may be performed using the computer network 500. The computer network 500 may include a system computer 530, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from hydrophones are stored in disk storage device 531. The system computer 530 may retrieve the appropriate data from the disk storage device 531 to process seismic data according to program instructions according to program instructions that correspond to the implementations of various technologies described herein. The program instructions may be written in a computer programming language, such as C++, Java and the like. The program instructions may be stored in a computer-readable memory, such as program disk storage device 533. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 530 may present output primarily onto graphics display 527. The system computer 530 may store the results of the methods described above on disk storage 529, for later use and further analysis. The keyboard 526, the pointing device (e.g., a mouse, trackball, or the like) 525 and the printer 528 may be provided with the system computer 530 to enable interactive operation.

The system computer 530 may be located at a data center remote from the survey region. The system computer 530 is in communication with hydrophones (either directly or via a recording unit, not shown), to receive signals indicative of the reflected seismic energy. After conventional formatting and other initial processing, these signals may be stored by the system computer 530 as digital data in the disk storage 531 for subsequent retrieval and processing in the manner described above. In one implementation, these signals and data may be sent to the system computer 530 directly from sensors, such as geophones, hydrophones and the like. When receiving data directly from the sensors, the system computer 530 may be described as part of an in-field data processing system. In another implementation, the system computer 530 may process seismic data already stored in the disk storage 531. When processing data stored in the disk storage 531, the system computer 530 may be described as part of a remote data processing center, separate from data acquisition. The system computer 530 may be configured to process data as part of the in-field data processing system, the remote data processing system or a combination thereof. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   receiving seismic data acquired by at least one seismic sensor;
   applying a first operator to the received seismic data in a first domain to generate a first set of seismic data that corresponds to the received seismic data due to a first seismic source, wherein the first domain is an encoding domain for the first seismic source;
   applying a second operator to the first set of seismic data in a second domain to generate a second set of seismic data that corresponds to residual seismic data due to a second seismic source, wherein the second domain is an encoding domain for the second seismic source;
   applying the first operator to the received seismic data in the second domain to generate a third set of seismic data that corresponds to the received seismic data due to the second seismic source;
   applying the second operator to the third set of seismic data in the first domain to generate a fourth set of seismic data that corresponds to residual seismic data due to the first seismic source;
   determining an estimate of the received seismic data due to the first seismic source, wherein the estimate of the received seismic data due to the first seismic source is a sum of the first set and the fourth set and this sum is subtracted by the second set; and
   processing the estimate of the received seismic data due to the first seismic source to determine the presence of hydrocarbon deposits in a subterranean area of the earth.

2. The method of claim 1, wherein the received seismic data are acquired from two simultaneously-fired or near-simultaneously-fired seismic sources.

3. The method of claim 1, wherein the first operator and the second operator are low frequency filters, coherency filters, f-k filters, tau-p filters, wavelet filters, curvelet filters, median filters, threshold filters, mask filters, Random Noise Attenuation filters, Singular Value Decomposition filters, model driven filters, datuming filters, wavefield extrapolation filters, migration filters, inverse filters or combinations thereof.

4. The method of claim 1, wherein the residual seismic data due to the first seismic source comprise the received seismic data that leaked into the third set of seismic data from the first seismic source, and wherein the residual seismic data due to the second seismic source comprise the received seismic data that leaked into the first set of seismic data from the second seismic source.

5. The method of claim 1, further comprising determining an estimate of the received seismic data due to the second seismic source, wherein the estimate of the received seismic data due to the second seismic source is a sum of the second set and the third set and this sum is subtracted by the fourth set.

6. A method for processing seismic data, comprising:
receiving seismic data acquired by at least one seismic sensor;
applying a first operator to the received seismic data in a first domain to generate a first set of seismic data that corresponds to the received seismic data due to a first seismic source, wherein the first domain is a spatial arrangement of data that is sorted according to the first seismic source, wherein the spatial arrangement is selected from a group consisting of common offset, common receiver and common shot;
applying a second operator to the first set of seismic data in a second domain to generate a second set of seismic data that corresponds to residual seismic data due to a second seismic source, wherein the second domain is a spatial arrangement of data that is sorted according to the second seismic source, wherein the spatial arrangement is selected from a group consisting of common offset, common receiver and common shot;
applying the first operator to the received seismic data in the second domain to generate a third set of seismic data that corresponds to the received seismic data due to the second seismic source;
applying the second operator to the third set of seismic data in the first domain to generate a fourth set of seismic data that corresponds to residual seismic data due to the first seismic source;
determining an estimate of the received seismic data due to the first seismic source, wherein the estimate of the received seismic data due to the first seismic source is a sum of the first set and the fourth set and this sum is subtracted by the second set; and
processing the estimate of the received seismic data due to the first seismic source to determine the presence of hydrocarbon deposits in a subterranean area of the earth.

* * * * *